US009184537B2

(12) United States Patent
Holub et al.

(10) Patent No.: US 9,184,537 B2

(45) Date of Patent: Nov. 10, 2015

(54) SELF-REJECTING CONNECTOR APPARATUS AND LOCKING METHOD THEREOF

(71) Applicant: J.S.T. CORPORATION, Farmington Hills, MI (US)

(72) Inventors: Franklin Holub, Farmington Hills, MI (US); Rajit Abraham, Farmington Hills, MI (US); David Demaratos, Farmington Hills, MI (US)

(73) Assignee: J.S.T. CORPORATION, Farmington Hills, MI (US)

( * ) Notice: Subject to any disclaimer, the term of this patent is extended or adjusted under 35 U.S.C. 154(b) by 0 days.

(21) Appl. No.: 14/063,134

(22) Filed: Oct. 25, 2013

(65) Prior Publication Data

US 2015/0118885 A1 Apr. 30, 2015

(51) Int. Cl.

*H01R 13/633* (2006.01)
*G06K 13/08* (2006.01)
*H01R 13/627* (2006.01)

(52) U.S. Cl.

CPC .................................... *H01R 13/627* (2013.01)

(58) Field of Classification Search

CPC .... H01R 13/633; H01R 13/635; G06K 13/08; G06K 13/0806

USPC .................................................. 439/152, 159

See application file for complete search history.

(56) References Cited

U.S. PATENT DOCUMENTS 4,614,015 A * 9/1986 Nagare et al. .................. 29/239
4,828,510 A * 5/1989 Muzslay ...................... 439/352
6,435,894 B2 8/2002 Little
6,875,033 B2 * 4/2005 Sato et al. ..................... 439/159
6,966,786 B1 * 11/2005 Motojima et al. ............ 439/159
2002/0001988 A1 * 1/2002 Fukase .......................... 439/352
2002/0090850 A1 * 7/2002 Zuin ............................. 439/159
2008/0160805 A1 * 7/2008 Ezaki ............................ 439/152

* cited by examiner

*Primary Examiner* — Gary Paumen

(74) *Attorney, Agent, or Firm* — Kratz, Quintos & Hanson, LLP

(57) ABSTRACT

A self-rejecting connector apparatus ensures that the connector apparatus of the present invention become fully engaged or fully locked when a rejection force, which pushes connector locks out of any partial-lock or partial-mate condition, ceases to be generated. A specially-shaped spring element, which is used to generate the rejection force, is blocked from being removed from the connector apparatus of this invention until the connector apparatus is fully engaged or fully locked.

19 Claims, 8 Drawing Sheets

SELF-REJECTING CONNECTOR APPARATUS AND LOCKING METHOD THEREOF

BACKGROUND OF THE INVENTION

1. Field of the Invention

The present invention generally relates to a self-rejecting connector apparatus that experiences a rejection force until the connector apparatus locks, and locking method thereof. More particularly, this invention is directed to a self-rejecting connector apparatus having a housing with connector locks that lockingly engage with a female or pocket member, and a spring element for providing a rejection force against the direction towards which the housing is introduced into the female or pocket member, the spring element engaging with a retainer which is introduced into the female or pocket member.

2. Discussion of the Relevant Art

U.S. Pat. No. 6,435,894 is directed to an electrical connector, which utilizes a connector position assurance (CPA) device or shorting clip for assuring the mating of relevant parts of the electrical connector. Although the CPA or shorting clip in U.S. Pat. No. 6,435,894 may detect if the mating parts have not completely mated, the CPA or shorting clip may not necessarily prevent the partial mating of the mating parts from occurring during the manual connecting operation thereof.

Moreover, the CPA and shorting clip are additional parts of the electrical connector of U.S. Pat. No. 6,435,894, which results in the manufacturing thereof becoming complicated and costly, and the assembling thereof becoming complex.

SUMMARY OF THE INVENTION

The self-rejecting connector apparatus of this invention utilizes a specially-shaped spring element that slides along a specially-shaped portion (a ramp-shape or the like) of the retainer or the female or pocket member to generate a rejection force that will push the connector locks of the housing out of any partial-lock or partial-mate condition until the connector locks of the housing can be fully locked or latched to the pocket or female member and/or the retainer. The spring element is blocked from leaving the specially-shaped portion of the retainer until the connector locks of the housing are fully locked or latched to the pocket or female member and/or the retainer.

DETAILED DESCRIPTION OF THE PREFERRED EMBODIMENTS

Figure 1:
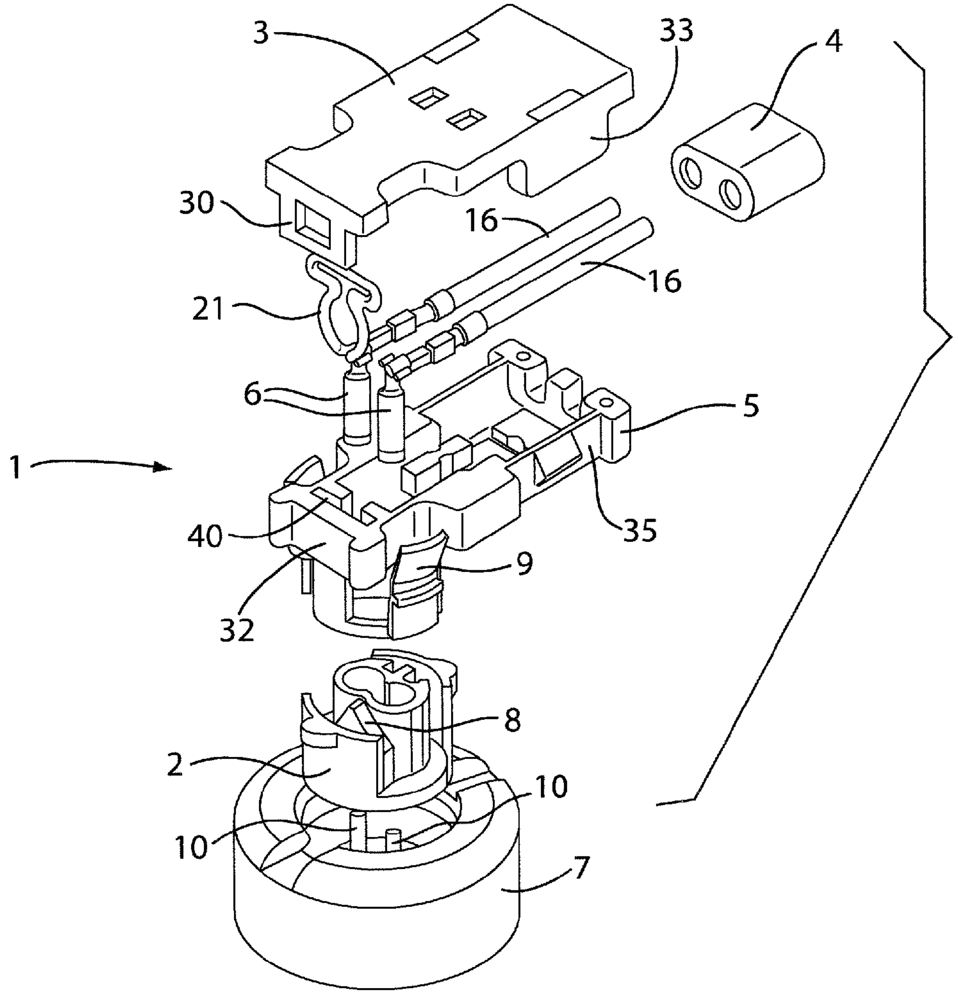
FIG. 1 is an exploded view of the self-rejecting connector apparatus of the present invention.

FIG. 1 is an exploded view of the self-rejecting connector apparatus, generally referred to by reference number 1. The self-rejecting connector apparatus 1 includes a cover 3 and a housing 5 to be fitted in an engaging and locking relationship with the female or pocket member 7. The self-rejecting connector apparatus 1 further includes a retainer 2 to be similarly fitted into the female or pocket member 7.

As further shown in FIG. 1, the housing 5 includes connector locks 9 to be engaged and locked into the female or pocket member 7. The housing 5 further includes terminals 6 connected to electric wires or cables 16 fitted within an insulator 4 (e.g., ferrite or the like). The terminals 6 are to be connected to male pin contacts 10 of the female or pocket member 7 when the housing 5 becomes fully engaged or locked into the female or pocket member 7.

Also shown in FIG. 1 is the retainer 2 having a specially-shaped member 8 (e.g., a triangular-shaped member or the like) onto which a specially-shaped spring element 21 engages for providing the rejection force that pushes the connector locks 9 of the housing 5 out of any partial locking or partial-mating condition until the connector locks 9 can be fully locked or latched to the pocket or female member 7 and/or the retainer 2, as more fully discussed below.

The cover 3 includes an end extending member 30 and side extending members 33 to be accommodated within end slot 32 and side slots 35 of the housing 5, respectively, when the connector apparatus 1 is fully assembled.

The housing 5 has a slot 40 for accommodating therethrough the specially-shaped spring element 21 during the process of assembling or engaging the connector apparatus 1.

Figure 2A:
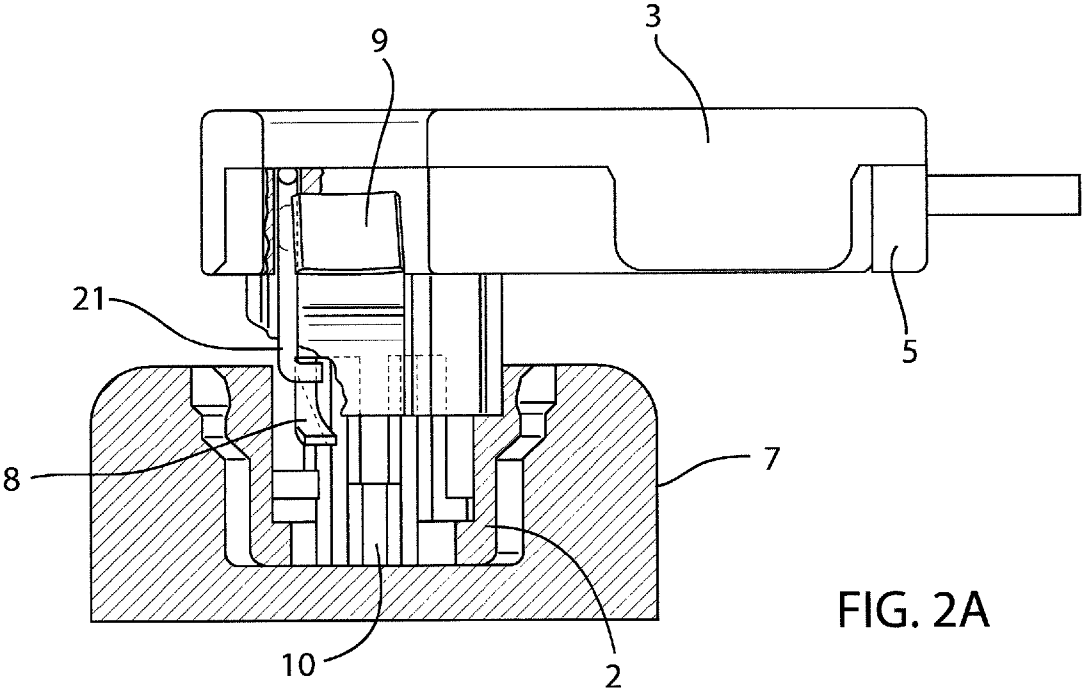
FIGS. 2A-2D are side elevation views showing the step-by-step manner in which the housing and the retainer are accommodated within the female or pocket member, the step-by-step manner in which the spring element slides along a portion of the retainer for providing the rejection force during the housing insertion process, and the step-by-step manner in which the connector locks of the housing engages and ultimately locks into the female or pocket member just before the spring element ceases to provide the rejection force, the retainer and the female or pocket member being shown in cross-sectional sections taken along line 2A-2D illustrated in FIG. 5.

FIGS. 2A-2D illustrate the step-by-step manner in which the housing 5, with the cover 3 mounted thereon, and the retainer 2 are accommodated within the female or pocket member 7. In, for example, FIG. 2A, the retainer is accommodated within the female or pocket member 7, while the housing 5 is shown as being introduced into the retainer 2 and the female or pocket member with the spring element 21 starting its sliding motion along the ramp portion of the specially-shaped member 8. As shown in FIG. 2A, the connector locks 9 of the housing 5 remain disengaged from the female or pocket member 7.

Figure 2B:
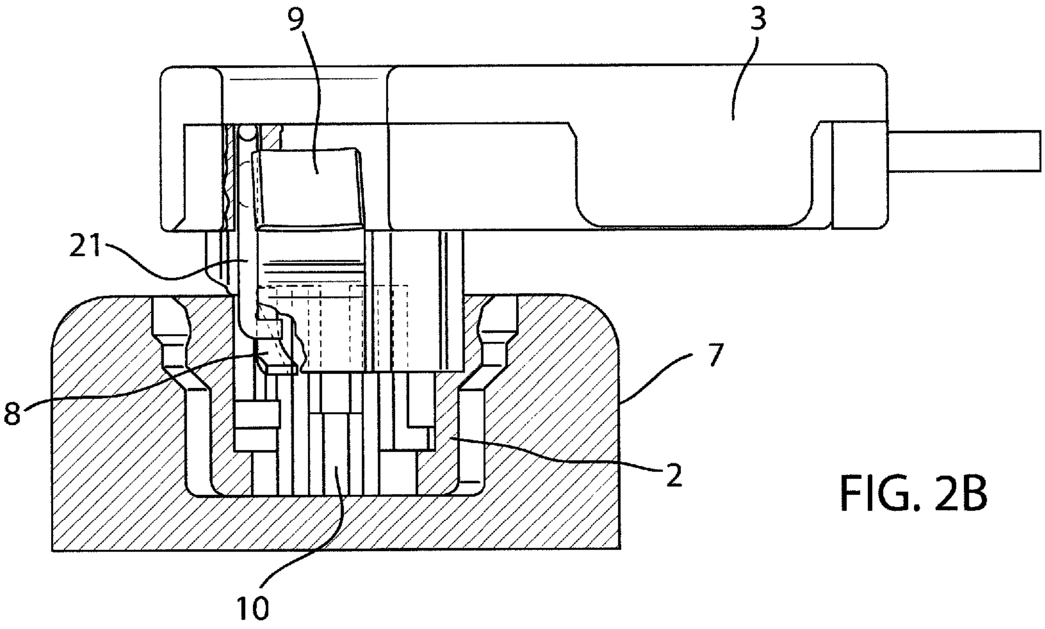

FIG. 2B shows the housing 5 being further introduced into the female or pocket member 7, with the spring element 21 midway its sliding motion along the ramp portion of the specially-shaped member 8, while the connector locks of the housing 5 remain disengaged from the female or pocket member 7.

Figure 2C:
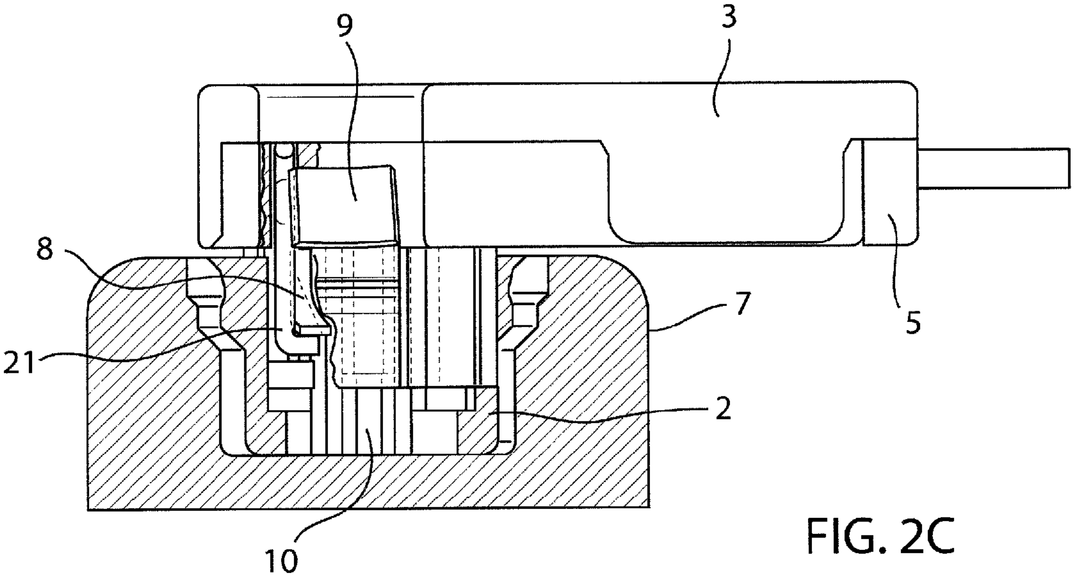
Figure 2D:
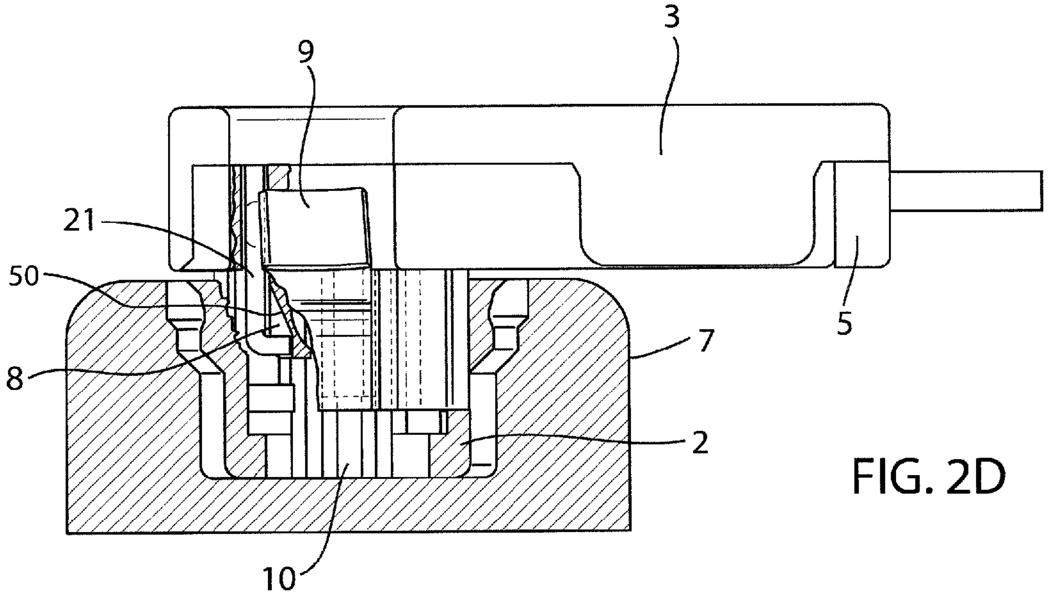

FIGS. 2C and 2D illustrate the housing 5 further introduced into the female or pocket member 7, with the connector locks 9 of the housing 5 fully engaged and locked within the female or pocket member 7 and the spring element 21 having completed its sliding motion along the ramp portion of the specially-shaped member 8 of the retainer 2, the terminals 6 now being connected with the male pin contacts 10.

FIG. 2D differs from FIG. 2C in that FIG. 2D shows the spring element 21 retracted to its original position and ready to be retraced from the specially-shaped member 8 along an internal inclined portion 50 thereof, which is further explained below with respect to the descriptions of FIGS. 3D and 3E. The spring element 21, as shown in FIG. 2D, may be retraced from the connector apparatus 1.

Figure 3A:
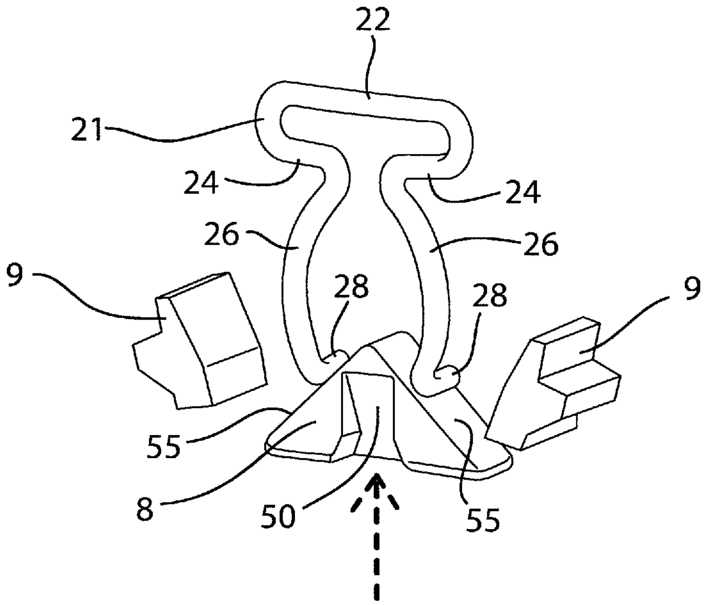
FIGS. 3A-3C are perspective views showing the step-by-step manner in which the spring element engages with a ramp portion of the retainer for providing the rejection force (shown with a dashed arrow) towards a direction opposite the travel direction of the housing towards the female or pocket member.
Figure 3B:
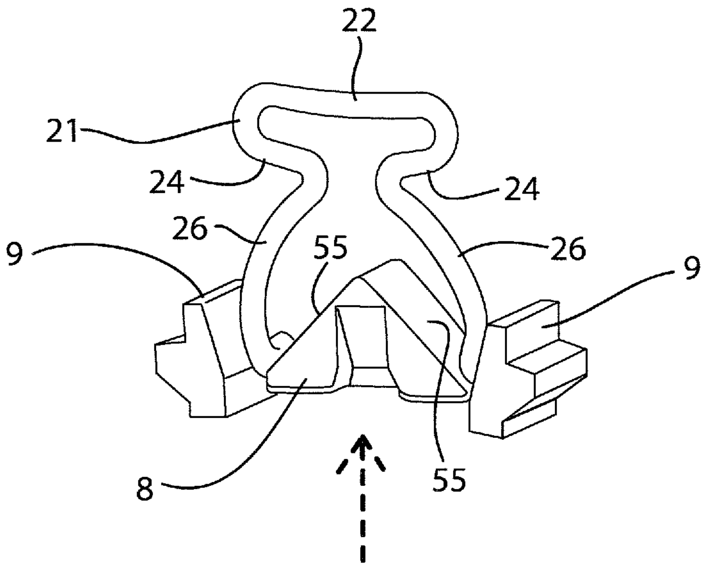
Figure 3C:
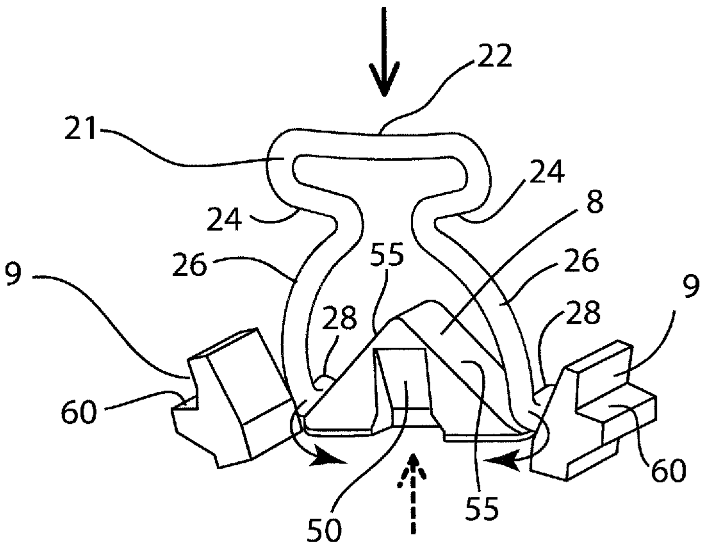

FIGS. 3A-3C specifically illustrate the manner in which the rejection force (shown by way of a dashed arrow) is created in pushing the connector locks 9 of the housing 5 out of any partial-lock or partial-mate condition with the female or pocket member 7.

As shown in FIG. 3A, the specially-shaped member 8 of the retainer 2 is, for example, triangular in shape having ramp portions 55 and, as discussed earlier, an internal inclined portion 50.

The specially-shaped spring element 21 has first portion 22 and second portions 24, third portions 26, and fourth portions 28 as shown in, e.g., FIG. 3A. As the spring element 21, accommodated with the housing 5, is pushed, along with the housing 5 and cover 3, towards the retainer 2 and female or pocket member 7, the fourth portions 28 slide downward along the ramp portion 55 of the specially-shaped member 8. Consequently, the third portions 26 resiliently spread out thereby creating the above-described rejection force (shown by way of a dashed arrow) that pushes out the housing 5 and thus its connector locks 9 from partially locking or partially mating with the female or pocket member 7. At this sequence of operation, the creation of the rejection force begins when the fourth portions 28 of the sliding element 21 begin to respectively slide along the ramp portion 55.

In the sequence of operation shown in FIG. 3B, while the housing 5 and cover 3 are pushed toward the retainer 2 and female or pocket member 7, the connector locks 9 are compressed by the opening edge 60 (further shown and discussed with respect to FIG. 4) of the female or pocket member 7. The compression of the connector locks 9 respectively impinges the connector locks 9 against the bottom portions of the ramp portions 55, thereby preventing the spring element 21 from advancing and thus increasing the rejection force at a rate higher than the rate increase of the rejection force up to this point of the sequence of operation. The rejection force gradually increases in the sequence of operation from FIG. 3A through FIG. 3B.

The ledge portions 60 of the connector locks 9, as the housing 5 and spring element 21 are pushed further toward the retainer 2 and the female or pocket member 7, become accommodated within the space 68 beneath the opening edge 60 of the female or pocket member 7. Thus, the connector locks 9 of the housing 5 become locked within the female or pocket member 7. At this point, the connector locks 9 spread out, thereby creating spaces between the bottom portions of the ramp portions 55 and the connector locks 9. Consequently, the spaces between the ramp portions 55 and the connector locks 9 allow the fourth portions 28 of the spring element 21 to pass therethrough, as shown in FIG. 3C.

Figure 3D:
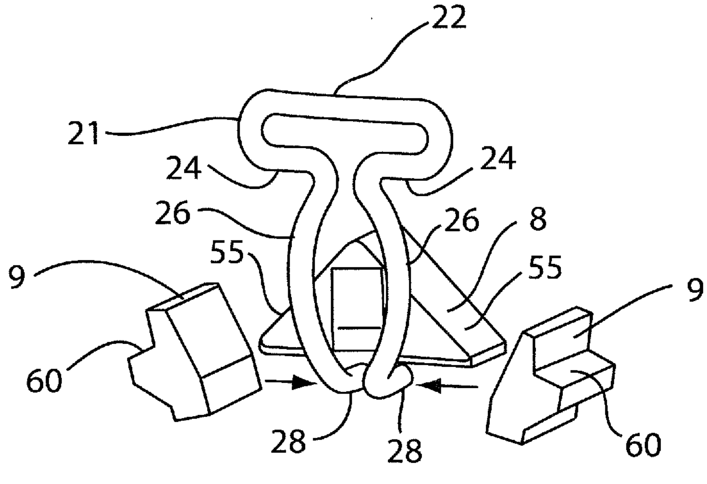
FIG. 3D is a perspective view showing the manner in which the spring element engages with the ramp portion of the retainer upon the termination of the rejection force.

Thereafter, after having passed through the above-discussed spaces between the ramp portions 55 and the connector locks 9, the fourth portions 28 of the spring element 21 retract inward toward their original positions along a space beneath the specially-shaped member 8 of the retainer 2, as shown in FIG. 3D.

In the sequence of operation of this invention, as shown in FIG. 3C, the rejection force decreases, while the rejection force becomes zero in the sequence of operation, as shown in FIG. 3D.

Figure 3E:
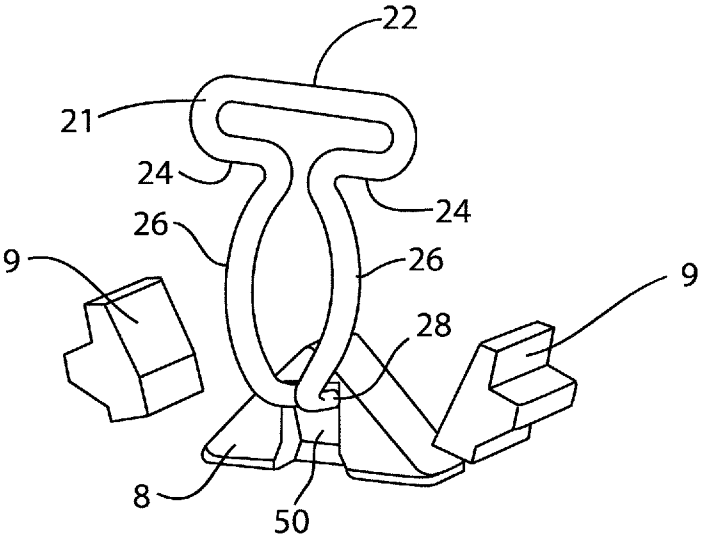
FIG. 3E is a perspective view showing the manner in which the spring element may be disengaged from the retainer.

As illustrated in FIG. 3E, the spring element 21 may be retracted from the retainer 2 with the fourth portions 28 of the spring element 21 sliding along the internal inclined portion 50 of the specially-shaped member 8.

Figure 4:
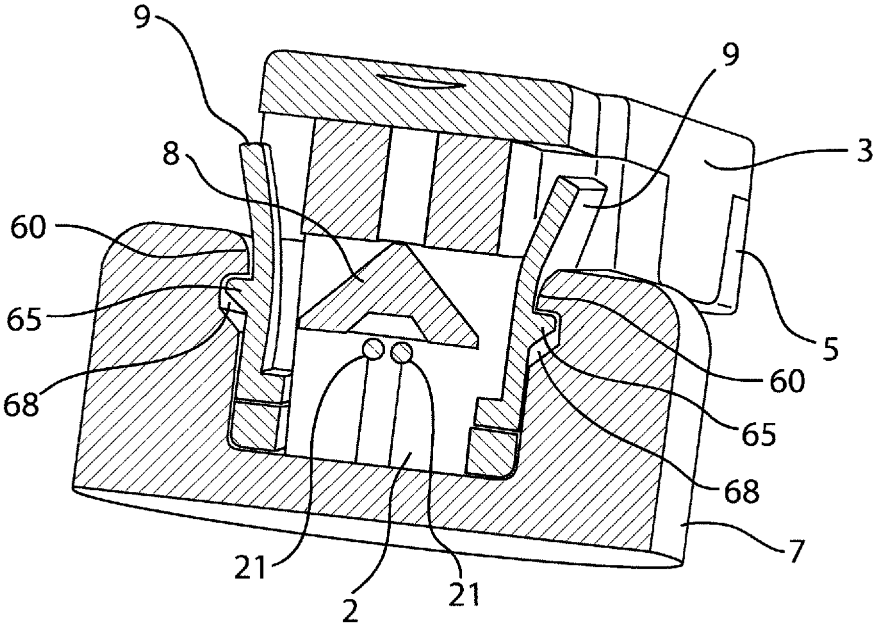
FIG. 4 is a cross-sectional view, taken along line 4-4 in FIG. 5, of the fully assembled self-rejecting connector apparatus of this invention.
Figure 5:
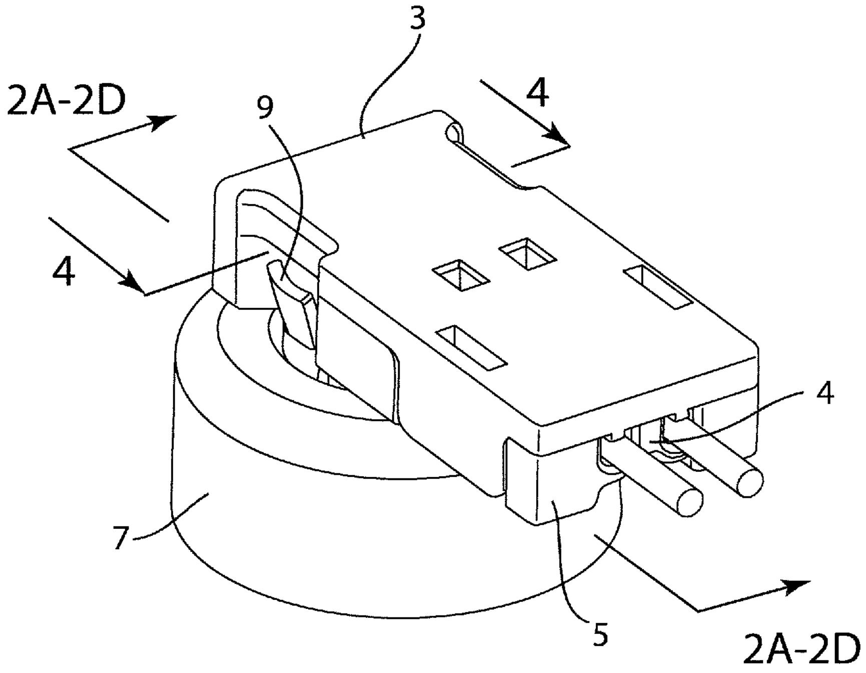
FIG. 5 is a perspective view of the fully assembled self-rejecting connector apparatus of this invention.

FIG. 4, a cross-sectional view taken along line 4-4 in FIG. 5, shows the self-rejecting connector apparatus 1 of the present invention in its fully locked condition (as similarly discussed above with respect to the sequence of operation, as illustrated in FIG. 3D).

FIG. 5 shows, in perspective view, the fully assembled, engaged and locked self-rejecting connector apparatus 1 of the present invention.

The self-rejecting connector apparatus 1 of this invention provides detection of a fully mated condition with certainty, thereby creating complete engagement or locking. The connector apparatus 1 will self-reject (i.e., the rejection force is created in pushing the connector locks 9 of the housing 5 out of any partial-lock or partial mate condition with the female or pocket member 7) any partial-mating.

Due to the above-discussed advantages or benefits derived from the present invention, it is not necessary to have a separate CPA or shorting clip. In addition, the connector apparatus of this invention allows for a minimum number of components resulting in the lowering of production cost.

The spring element 21 can independently "check" the latch state of the separate connector locks 9 (i.e., assure that the connector locks 9 are engaged or locked within the female or pocket member 7) or provide an "inertial lock"-like function for assuring the connector locks 9 will become engaged or locked with the female or pocket member 7. Moreover, with the connector apparatus 1 of this invention, the maximum rejection force is created at the point in the mating travel where the most rejection force is required.

The connector device 1 of the present invention may also include a structural arrangement whereby a single "legged" spring element is provided, such single "legged" spring element requiring only one ramp portion for the retainer and only a single connector lock.

The connector device 1 of the present invention may also include a structural arrangement whereby the spring element 21 engages with the female or pocket member 7, instead of the ramp portion of the retainer 2. The spring element 21 may be made wider to engage portions on either side of the retainer 2. The spring element 21 may be provided so that the ramp portion may be incorporated into the spring element 21 itself, instead of the ramp portion 55 being provided for the retainer 2.

The present invention is not limited to the above-described embodiments; and various modifications in design, structural arrangement or the like may be used without departing from the scope or equivalents of the present invention.

We claim:

1. A self-rejecting connector apparatus, comprising:

a housing having terminals and at least a connector lock;

a pocket member having male pin contacts for engaging with the terminals; and a spring element; and a retainer accommodated within the pocket member, wherein the spring element slidingly engages with the retainer, and wherein the spring element provides a rejection force until such time as the connector lock is fully engaged with the pocket member.

2. The self-rejecting connector apparatus as in claim 1, wherein the rate of the rejection force increases from the start of engagement between the slide element and the retainer.

3. The self-rejecting connector apparatus as in claim 1, wherein the rejection force terminates when the connector lock fully engages with the pocket member.

4. The self-rejecting connector apparatus as in claim 2, wherein the retainer includes a ramp portion onto which the spring element slidingly engages.

5. The self-rejecting connector apparatus as in claim 4, wherein the rejection force is created while the spring element slidingly engages with the ramp portion.

6. The self-rejecting connector apparatus as in claim 1, wherein the rejection force pushes the connector locks out of any partial-locking or partial-mating condition with the pocket member.

7. The self-rejecting connector apparatus as in claim 4, wherein the spring element includes portions that spread out upon sliding along the ramp portion of the retainer.

8. The self-rejecting connector apparatus as in claim 7, wherein the portions of the sliding element that spread out are blocked from advancing into an at-rest original position just prior to the connector locks being fully engaged with the pocket member.

9. The self-rejecting connector apparatus as in claim 8, wherein the portions of the sliding element that spread out are blocked from advancing by the ramp portion and the connector locks.

10. The self-rejecting connector apparatus as in claim 8, wherein the portions of the sliding element that spread out return to their original non-stressed positions when the connector locks are fully engaged with the pocket member.

11. A method for engaging a self-rejecting apparatus, comprising the steps of:

advancing a housing towards a pocket member, the housing having terminals and at least a connector lock, and the pocket member having male pin contacts;

creating a rejection force that pushes the connector locks out of any partial-locking or partial-mating condition with the pocket member;

fully locking the connector lock of the housing with the pocket member; and terminating the creation of the rejection force, wherein the step of creating the rejection force includes a spring element that slidingly engages with a retainer accommodated with the pocket member.

12. The method for engaging the self-rejecting apparatus as in claim 11, wherein the rate of the rejection force increases from the start of the engagement between the slide element and the retainer.

13. The method for engaging the self-rejecting apparatus as in claim 12, wherein rejection force terminates when the connector lock fully engages with the pocket member.

14. The method for engaging the self-rejecting apparatus as in claim 13, further including the step of spreading out upon the sliding thereof along a ramp portion of the retainer.

15. The method for engaging the self-rejecting apparatus as in claim 14, further includes the step of blocking the portions of the sliding element that spread out from advancing into an at-rest original position just prior to the connector locks being fully engaged with the pocket member.

16. The method for engaging the self-rejecting connector apparatus as in claim 15, wherein the portions of the sliding element that spread out are blocked from advancing by the ramp portion and the connector locks.

17. The method for engaging the self-rejecting connector apparatus as in claim 16, wherein the portions of the sliding element that spread out return to their original non-stressed positions when the connector locks are fully engaged with the pocket member.

18. The method for engaging the self-rejecting connector apparatus as in claim 17, wherein the terminals of the housing engage with male pin contacts of the pocket member.

19. The method for engaging the self-rejecting connector apparatus as in claim 16, further including the step of retracting the sliding element from the retainer.

* * * * *